(12) United States Patent
Sugizaki et al.

(10) Patent No.: US 9,065,948 B2
(45) Date of Patent: Jun. 23, 2015

(54) FLEXIBLE SHADING MEMBER FOR PERFORMING SHADING CORRECTION AND MOVABLE RELATIVE TO FIRST AND SECOND IMAGE READING SECTIONS

(75) Inventors: Yoshiaki Sugizaki, Shizuoka (JP); Hidetoshi Yokochi, Shizuoka (JP); Hiroyuki Tsuchihashi, Shizuoka (JP); Isao Yahata, Shizuoka (JP); Takahiro Kawaguchi, Shizuoka (JP); Ken Iguchi, Shizuoka (JP); Kikuo Mizutani, Shizuoka (JP); Hiroyuki Taki, Shizuoka (JP); Chiaki Iizuka, Shizuoka (JP); Toshiaki Oshiro, Shizuoka (JP); Hiroyuki Hazu, Shizuoka (JP); Yoichi Yamaguchi, Shizuoka (JP); Hiroyuki Sugiyama, Shizuoka (JP); Yuichi Saito, Shizuoka (JP); Jun Ishii, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 184 days.

(21) Appl. No.: 13/484,232

(22) Filed: May 30, 2012

(65) Prior Publication Data

US 2013/0003138 A1    Jan. 3, 2013

Related U.S. Application Data

(60) Provisional application No. 61/502,250, filed on Jun. 28, 2011, provisional application No. 61/502,253, filed on Jun. 28, 2011, provisional application No. 61/533,170, filed on Sep. 9, 2011, provisional application No. 61/533,173, filed on Sep. 9, 2011.

(51) Int. Cl.
*H04N 1/40* (2006.01)
*H04N 1/00* (2006.01)
(Continued)

(52) U.S. Cl.
CPC ......... *H04N 1/00588* (2013.01); *H04N 1/401* (2013.01); *H04N 1/4076* (2013.01); *H04N 1/00591* (2013.01); *H04N 1/00602* (2013.01); *H04N 1/00612* (2013.01); *H04N 1/0062* (2013.01); *H04N 1/00633* (2013.01); *H04N 1/2032* (2013.01); *H04N 2201/044* (2013.01);
(Continued)

(58) Field of Classification Search
None
See application file for complete search history.

(56) References Cited

U.S. PATENT DOCUMENTS 4,987,441 A * 1/1991 Hudspeth ..................... 355/50
7,633,653 B2 * 12/2009 Nishizawa et al. ......... 358/461
(Continued)

FOREIGN PATENT DOCUMENTS

CN    1531328    9/2004
CN    101090440    12/2007
(Continued)

OTHER PUBLICATIONS

Office Action dated May 27, 2014, filed in corresponding Japanese Patent Application No. 2012-128958, with English translation.

*Primary Examiner* — Steven Kau
(74) *Attorney, Agent, or Firm* — Patterson & Sheridan LLP (57) ABSTRACT

A shading device includes: a shading member to pass a conveying path for conveying a recoding medium to plural image reading sections and reach the plural image reading sections; and a moving member to move the shading member between the plural image reading sections and a retracted position on the outside of the conveying path.

17 Claims, 5 Drawing Sheets

(51) Int. Cl.
*H04N 1/401* (2006.01)
*H04N 1/407* (2006.01)
*H04N 1/203* (2006.01)
*G03G 15/00* (2006.01)

(52) U.S. Cl.
CPC ...... *G03G 15/60* (2013.01); *G03G 2215/00189* (2013.01)

(56) References Cited

U.S. PATENT DOCUMENTS 8,503,039 B2 * 8/2013 Nishikawa .................... 358/461

| 2004/0179242 | A1 | 9/2004 | Nakaya |
| 2007/0223062 | A1 | 9/2007 | Tanaka et al. |
| 2007/0291326 | A1 | 12/2007 | Morita et al. |
| 2011/0164290 | A1 | 7/2011 | Nishikawa |

FOREIGN PATENT DOCUMENTS

| JP | H04-40058 | | 10/1992 |
| JP | 2002-209068 | * | 7/2002 |
| JP | P2002-344709 A | | 11/2002 |
| JP | 2007-258963 | | 10/2007 |
| JP | P2010-010991 A | | 1/2010 |

* cited by examiner

FLEXIBLE SHADING MEMBER FOR PERFORMING SHADING CORRECTION AND MOVABLE RELATIVE TO FIRST AND SECOND IMAGE READING SECTIONS

CROSS-REFERENCE TO RELATED APPLICATION

This application is based upon and claims the benefit of priority from Provisional U.S. Applications 61/502,250 filed on Jun. 28, 2011, 61/502,253 filed on Jun. 28, 2011, 61/533,170 filed on Sep. 9, 2011, and 61/533,173 filed on Sep. 9, 2011 the entire contents of which are incorporated herein by reference.

FIELD

Embodiments described herein relate generally to a shading device that performs shading correction for an image reading section used in a scanner, an erasing (a decoloring) apparatus, or the like.

BACKGROUND

As a scanner, an erasing (a decoloring) apparatus that erases (decolors) an image formed on a sheet, or the like, there is an apparatus that reads both sides of a sheet using two reading sensors. The reading sensors respectively include shading mechanisms for optimizing reading sensitivity and perform shading correction for correcting a read image using correction data obtained by reading white shading plates of the shading mechanisms.

Since the reading sensors respectively include the shading mechanisms, costs increase and a space for the shading mechanisms is necessary. Therefore, it is likely that a reduction in size or a reduction in costs of the scanner, the erasing apparatus, or the like is prevented.

DETAILED DESCRIPTION

In general, according to one embodiment, a shading device includes: a shading member to pass a conveying path for conveying a recoding medium to plural image reading sections and reach the plural image reading sections; and a moving member to move the shading member between the plural image reading sections and a retracted position on the outside of the conveying path.

Exemplary embodiments are explained below.

First Embodiment

Figure 1:
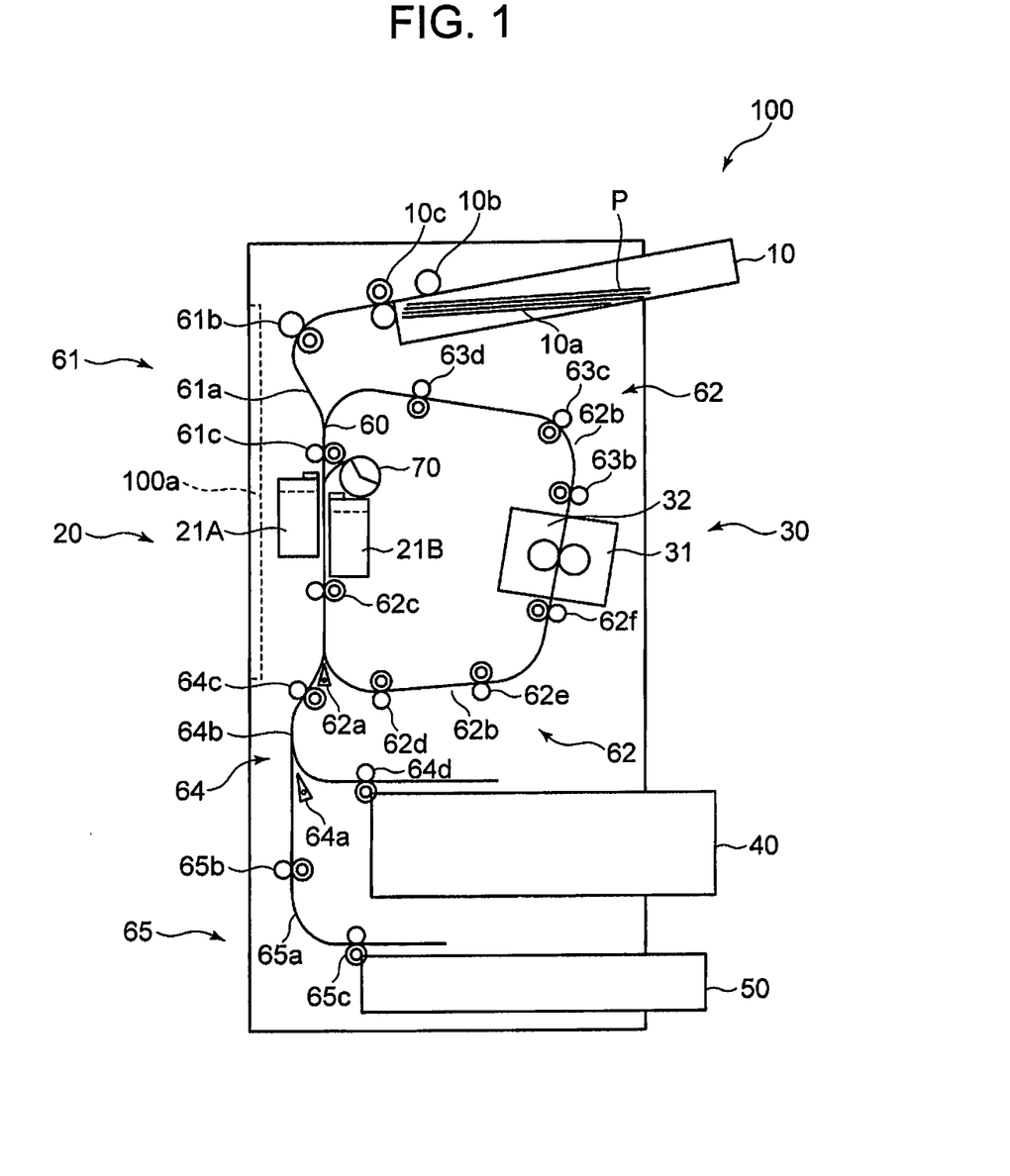
FIG. 1 is a schematic diagram of an erasing apparatus also used as a scanner mounted with a shading device according to a first embodiment.

FIG. 1 is a schematic diagram of an erasing (a decoloring) apparatus 100 also used as a scanner mounted with a shading device according to a first embodiment. If the erasing apparatus 100 functions as the erasing apparatus, the erasing apparatus 100 erases an erasable image formed on a sheet P, which is a recording medium. If the erasing apparatus 100 functions as the scanner, the erasing apparatus 100 reads an image formed on the sheet P which is a recording medium.

The erasing apparatus 100 includes a paper feeding section 10 for the sheet P, a reading section 20, a shading section 70 as the shading device, an erasing section 30, a stacking tray 40, and an NG sheet stacking tray 50.

The erasing apparatus 100 includes a first conveying section 61, a second conveying section 62, a third conveying section 64, and a fourth conveying section 65. The first conveying section 61 includes a first conveying path 61a that reaches a first diverting section 62a from the paper feeding section 10 through the reading section 20. The first conveying section 61 includes conveying rollers 61b, 61c, and 62c along a first conveying path 61a. The second conveying section 62 includes a second conveying path 62b that branches from a branching point, where the first diverting section 62a is arranged, and merges with the first conveying path 61a at a merging point 60 upstream of the reading section 20.

The erasing section 30 is arranged in the second conveying path 62b. The second conveying section 62 includes conveying rollers 62d, 62e, 62f, 63b, 63c, and 63d along the second conveying path 62b. The third conveying section 64 includes a third conveying path 64b that reaches the stacking tray 40 from the first diverting section 62a through a second diverting section 64a. The third conveying section 64 includes conveying rollers 64c and 64d along the third conveying path 64b. The fourth conveying section 65 includes a fourth conveying path 65a from the second diverting section 64a to the NG sheet stacking tray 50. The fourth conveying section 65 includes conveying rollers 65b and 65c along the fourth conveying path 65a.

The second conveying section 62 can convey the sheet P, which is conveyed from the reading section 20, in the direction of the reading section 20 again through the erasing section 30.

The paper feeding section 10 includes a paper feeding tray 10a on which, for example, the sheet P of which an image is to be read or an image is to be erased is stacked, a pickup roller 10b that picks up the sheet P from the paper feeding tray 10a, and a separation roller 10c.

The reading section 20 includes a first scanner section 21A as a first image reading section and a second scanner section 21B as a second image reading section.

The first scanner section 21A and the second scanner section 21B are opposed to each other across the first conveying path 61a. The first scanner section 21A and the second scanner section 21B include reading units such as CCD (Charge Coupled Device) scanners or CMOS sensors. For example, the first scanner section 21A reads an image on the front side, which is a first side, of the sheet P that passes the first conveying path 61a and the second scanner section 21B reads an image on the rear side, which is a second side, of the sheet P that passes the first conveying path 61a.

For example, if the first scanner section 21A and the second scanner section 21B include the CCD scanners, reading depth can be set relatively large. If the reading depth is large, it is possible to set a conveying path for the sheet P wide and prevent a jam of the sheet P.

The shading section 70 is used for shading correction for the two scanners of the first scanner section 21A and the second scanner section 21B.

The erasing section 30 erases an image of the sheet P which is conveyed. For example, the erasing section 30 heats the sheet P to erasing temperature of the image and erases the image formed on the sheet P. The erasing section 30 includes, for example, a first erasing unit 31 that erases an image on the front side of the sheet P and a second erasing unit 32 that erases an image on the rear side of the sheet P.

The stacking tray 40 stacks sheet P for which image reading ends or the sheet P reusable after erasing of an image. The NG sheet stacking tray 50 stacks sheet P determined as unreusable after erasing of an image.

If reading operation or erasing operation is started by these components, the erasing apparatus 100 reads, in the first scanner section 21A and the second scanner section 21B, the sheet P conveyed from the paper feeding tray 10a, erases an image of the sheet P in the erasing section 30, and conveys the sheet P to the stacking tray 40 or the NG sheet stacking tray 50.

A conveying path for the sheet P conveyed in the erasing apparatus 100 is set on the basis of a processing mode executed by the erasing apparatus 100. The erasing apparatus 100 includes, for example, (1) a first erasing mode for performing only erasing processing for an image without performing image reading, (2) a second erasing mode for performing the erasing processing for an image after reading the image, (3) a third erasing mode for reading, without performing image reading before erasing of an image, the sheet P after the erasing processing for the image and discriminating whether the sheet P is reusable, (4) a fourth erasing mode for carrying out the erasing processing for an image after reading of the image and further carrying out sorting for the sheet P, and (5) a reading mode for performing image reading without performing erasing of an image.

Figure 2:
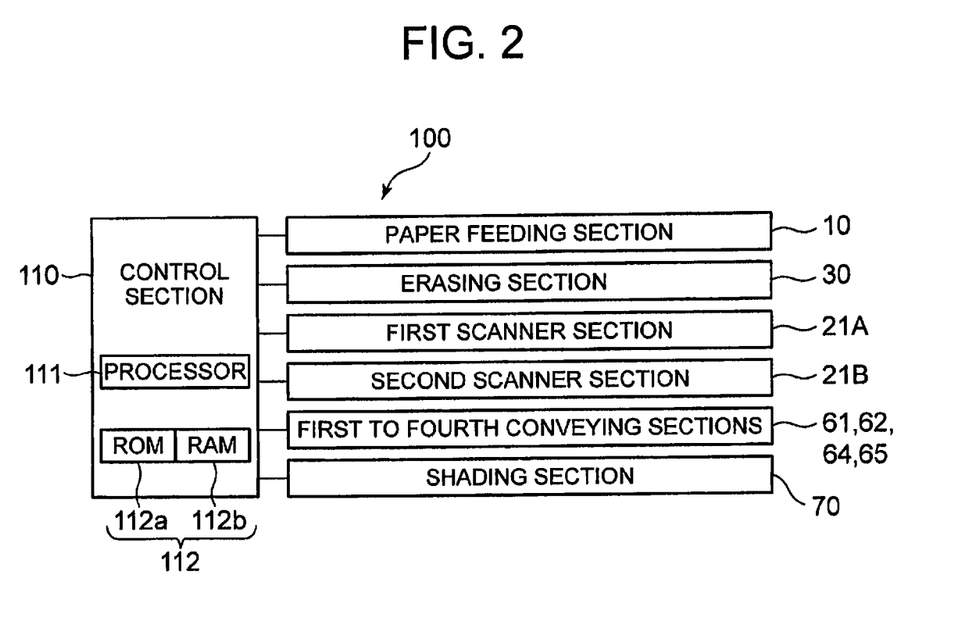
FIG. 2 is a schematic block diagram of the configuration of the erasing apparatus.

A control section 110 of the erasing apparatus 100 shown in a block diagram of FIG. 2 controls the paper feeding section 10, the first scanner section 21A, the second scanner section 21B, the shading section 70, the erasing section 30, and the first to fourth conveying sections 61, 62, 64, and 65. The control section 110 includes a processor 111 and a memory 112. The memory 112 includes a ROM (Read Only Memory) 112a having stored therein various control programs and a RAM (Random Access Memory) 112b that provides a temporary work area. For example, the processor 111 subjects a read image read by the first scanner section 21A or the second scanner section 21B to shading correction. For example, the processor 111 determines a printing ratio of the sheet P from image data after the shading correction and determines whether an image of the sheet P is erased. Alternatively, the processor 111 temporarily stores the image data after the shading correction in the RAM 112b.

In the first erasing mode, the erasing apparatus 100 conveys the sheet P, which is fed from the paper feeding section 10, from the first conveying path 61a through the second conveying section 62 and erases an image of the sheet P in the erasing section 30. The erasing apparatus 100 conveys, after the erasing of the image of the sheet P, the sheet P along the second conveying path 62b, the first conveying path 61a, and the third conveying path 64b, stacks the sheet P on the stacking tray 40, and ends the processing.

In the second erasing mode, the erasing apparatus 100 reads the image in the first scanner section 21A and the second scanner section 21B while the sheet P, which is fed from the paper feeding section 10, passes the first conveying path 61a. The erasing apparatus 100 subjects read image data to the shading correction and temporarily stores the image data in, for example, the RAM 112b. The erasing apparatus 100 erases the image of the sheet P in the erasing section 30 after the image reading. After the erasing, the erasing apparatus 100 conveys the sheet P along the second conveying path 62b, the first conveying path 61a, and the third conveying path 64b, stacks the sheet P on the stacking tray 40, and ends the processing.

In the third erasing mode, the erasing apparatus 100 conveys the sheet P, which is fed from the paper feeding section 10, along the first conveying path 61a and the second conveying path 62b and erases the image of the sheet P in the erasing section 30. After the erasing, the erasing apparatus 100 reads, in the first scanner section 21A and the second scanner section 21B, the sheet P that passes the first conveying path 61a through the second conveying path 62b. The erasing apparatus 100 determines, from a result of the reading, whether the sheet P is reusable, sorts the sheet to the stacking tray 40 or the NG sheet stacking tray 50 according to the determination, and ends the processing.

In the fourth erasing mode, the erasing apparatus 100 reads the image in the first scanner section 21A and the second scanner section 21B while the sheet P, which is fed from the paper feeding section 10, passes the first conveying path 61a. The erasing apparatus 100 subjects read image data to the shading correction and temporarily stores the image data in, for example, the RAM 112b. After the image reading, the erasing apparatus 100 erases the image of the sheet P in the erasing section 30. After the erasing, the erasing apparatus 100 reads, in the first scanner section 21A and the second scanner section 21B, the sheet P that passes the first conveying path 61a through the second conveying path 62b. The erasing apparatus 100 determines, from a result of the reading, whether the sheet P is reusable, sorts the sheet P to the stacking tray 40 or the NG sheet stacking tray 50 according to the determination, and ends the processing.

In the reading mode, the erasing apparatus 100 reads the image in the first scanner section 21A and the second scanner section 21B while the sheet P, which is fed from the paper feeding section 10, passes the first conveying path 61a. The erasing apparatus 100 subjects read image data to the shading correction and temporarily stores the image data in, for example, the RAM 112b. After the image reading, the erasing apparatus 100 stacks the sheet P on the stacking tray 40 without performing erasing and ends the processing.

Figure 3:
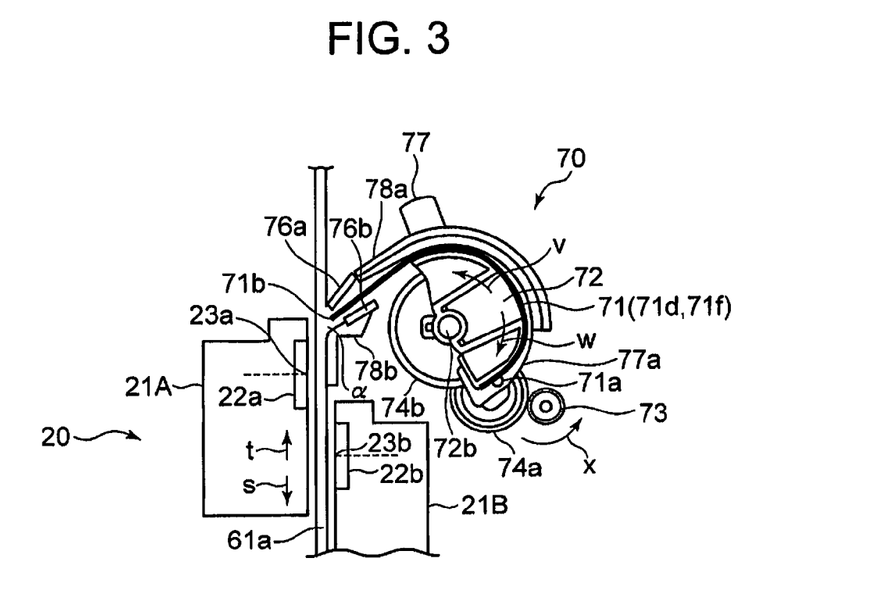
FIG. 3 is a schematic explanatory diagram of a shading section according to the first embodiment, wherein a state in which a shading plate is present in a home position is viewed from the front side.

The shading section 70 is explained in detail. As shown in FIG. 3, the shading section 70 is present on the second scanner section 21B side with respect to the first conveying path 61a. The shading section 70 includes a shading plate 71 as a white reference plate for shading and as a shading member, a drum 72 shape of semicircle, as a winding member, a motor 73, a first gear 74a, a second gear 74b, cleaners 76a and 76b as cleaning members, a sensor 77, an upper guide 78a, and a lower guide 78b. The drum 72, the motor 73, the first gear 74a, and the second gear 74b configure a moving member. The cleaning members are explained below.

Since the shading section 70 is present on the second scanner section 21B side, for example, if a sidewall 100a of the erasing apparatus 100 is opened and the first conveying path 61a is opened to remove a paper jam, it is unnecessary to take into account wires and the like of the shading section 70. Therefore, an operator can easily perform jam treatment.

The shading plate 71 passes the first conveying path 61a, moves in an arrow s direction and an arrow t direction, and reaches the first scanner section 21A and the second scanner section 21B. The shading plate 71 has at least scan width for the first and second scanner sections 21A and 21B. One side of the shading plate 71 along the moving direction in the first conveying path 61a is fixed and supported on the drum 72 by a screw 71a. The other side 71b of the shading plate 71 is free.

Figure 4:
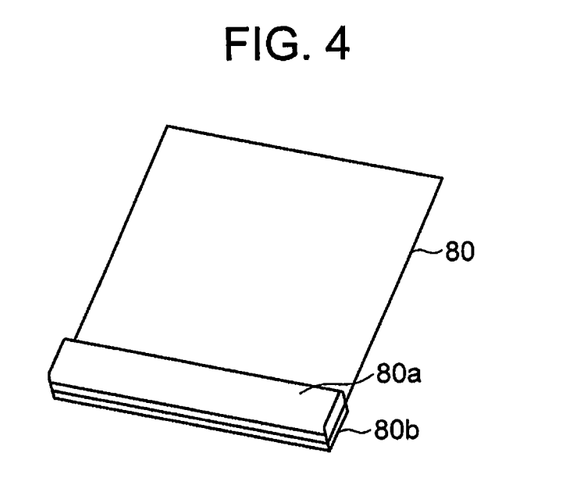
FIG. 4 is a schematic explanatory diagram of another example of the shading plate.

The material of the shading plate 71 is not limited as long as the material stably retains a white state and is excellent in flexibility and durability. As the white shading plate 71, for example, a white polyester film is used. The shading plate 71 does not have to be a single member and may be, for example, as shown in FIG. 4, formed by attaching white papers 80a and 80b, which are white members, to both surfaces on the other free side of a polyester film 80 as a supporting member excellent in flexibility and durability.

The motor 73 is a stepping motor. The motor 73 reciprocatingly rotates the drum 72 via the first gear 74a and the second gear 74b. The drum 72 rotates in an arrow v direction and lets out the shading plate 71 in the arrow s direction. The drum 72 rotates in an arrow w direction and winds the shading plate 71 in the arrow t direction.

Figure 5:
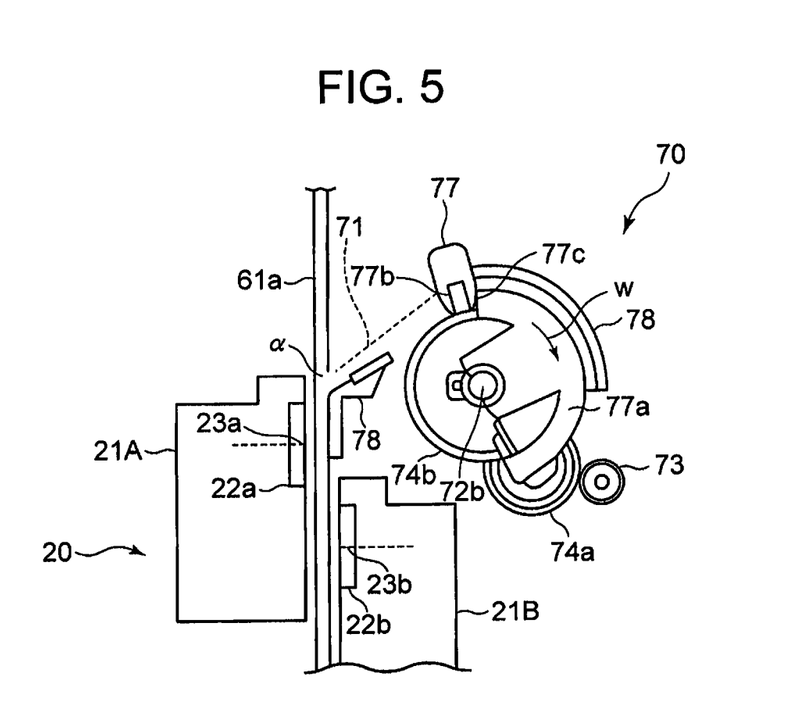
FIG. 5 is a schematic explanatory diagram of a sensor that detects a state in which the shading plate is present in the home position.

The shading section 70 includes the sensor 77 adjacent to the rear side of the drum 72. As shown in FIG. 5, the shading section 70 includes a plate 77a with which the sensor 77 detects a rotating position of the drum 72. The plate 77a is attached to a shaft 72b of the drum 72 and rotates integrally with the drum 72. If a detecting section 77b of the sensor 77 detects an end 77c of the plate 77a according to the rotation in the arrow w direction of the drum 72 and detects that the plate 77a passes the detecting section 77b, the sensor 77 detects that the drum 72 returns to a home position.

For example, if the first scanner section 21A and the second scanner section 21B are in a reading state, the drum 72 is present in the home position. If the drum 72 is present in the home position, as shown in FIG. 3, the shading plate 71 is wound by the drum 72. The other side 71b of the shading plate 71 is present in a retracted position α on the outer side of the first conveying path 61a.

The upper guide 78a and the lower guide 78b guide the shading plate 71 in the direction of the first conveying path 61a.

The movement of the shading plate 71 of the shading section 70 is explained. For example, in the case of the second erasing mode, the third erasing mode, the fourth erasing mode, or the reading mode, if the erasing apparatus 100 generates a reading command, the processor 111 controls the shading section 70 for the first scanner section 21A and the second scanner section 21B to acquire shading correction data. According to the control by the processor 111, the shading section 70 moves the other side 71b of the shading plate 71 to reading positions 23a and 23b of the first scanner section 21A and the second scanner section 21B.

Figure 6:
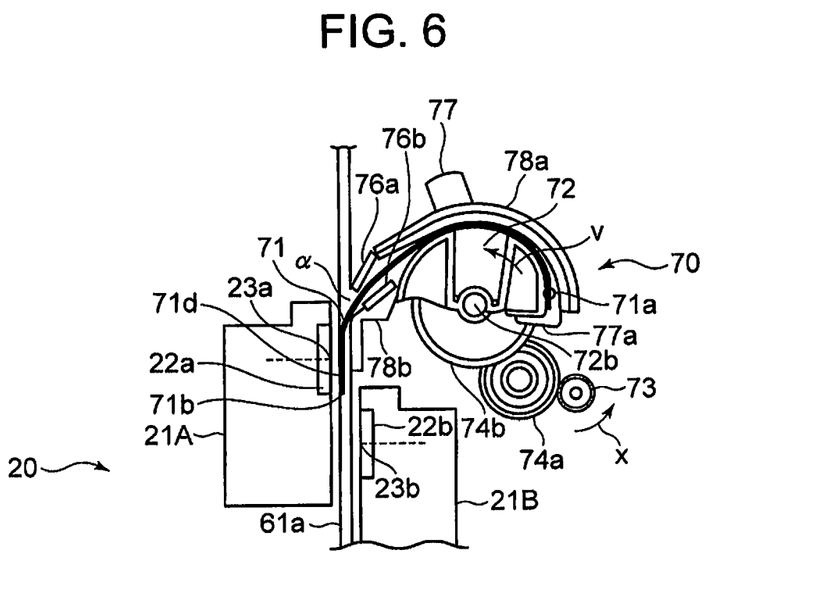
FIG. 6 is a schematic explanatory diagram of a state in which the other side of the shading plate reaches an A scanner section.

The shading section 70 rotates the motor 73 in an arrow x direction a specified number of steps until the other side 71b of the shading plate 71 reaches the reading position 23a of the first scanner section 21A from a state shown in FIG. 3 in which the other side 71b of the shading plate 71 is present in the retracted position α. According to the rotation of the motor 73 in the arrow x direction, the drum 72 rotates in the arrow v direction via the first gear 74a and the second gear 74b. The other side 71b of the shading plate 71 is let out by the drum 72 and moves forward from the retracted position α into the first conveying path 61a along the upper guide 78a and the lower guide 78b. If the other side 71b of the shading plate 71 reaches the reading position 23a of the first scanner section 21A as shown in FIG. 6, the motor 73 once stops.

Figure 7:
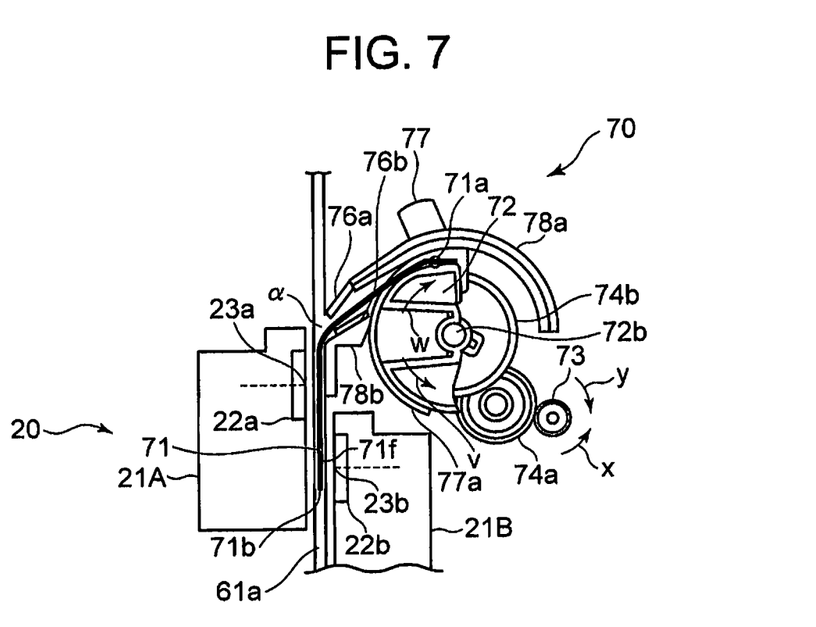
FIG. 7 is a schematic explanatory diagram of a state in which the other side of the shading plate reaches a B scanner section.

The first scanner section 21A reads a first surface 71d of the shading plate 71. If the first scanner section 21A ends the reading of the shading plate 71, the motor 73 further rotates in the arrow x direction the specified number of steps until the other side 71b of the shading plate 71 reaches the reading position 23b of the second scanner section 21B. According to the rotation of the motor 73 in the arrow x direction, the drum 72 rotates in the arrow v direction and the other side 71b of the shading plate 71 further let out by the drum 72. If the other side 71b of the shading plate 71 reaches the reading position 23b of the second scanner section 21B as shown in FIG. 7 from the reading position 23a of the first scanner section 21A, the motor 73 stops. The second scanner section 21B reads a second surface 71f of the shading plate 71. If the second scanner section 21B ends the reading of the shading plate 71, the motor 73 rotates in an arrow y direction.

According to the rotation of the motor 73 in the arrow y direction, the drum 72 rotates in the arrow w direction via the first gear 74a and the second gear 74b. The shading plate 71 is wound by the drum 72. The other side 71b of the shading plate 71 moves in the arrow t direction along the first conveying path 61a. If the drum 72 rotates in the arrow w direction and the sensor 77 detects the end 77c of the plate 77a as shown in FIG. 5, the processor 111 determines that the drum 72 reaches the home position and stops the motor 73 of the shading section 70. If the drum 72 reaches the home position, the other side 71b of the shading plate 71 reaches the retracted position α. The other side 71b of the shading plate 71 is surely retracted from the first conveying path 61a.

The first scanner section 21A inputs shading correction data which is obtained by reading the first surface 71d of the shading plate 71, to the processor 111. The second scanner section 21B inputs shading correction data which is obtained by reading the second surface 71f of the shading plate 71, to the processor 111. The processor 111 temporarily stores the shading correction data of the first scanner section 21A and the second scanner section 21B in the RAM 112b and ends the acquisition of the shading correction data. After acquiring the shading correction data, the erasing apparatus 100 executes the reading command.

The erasing apparatus 100 executes the reading commands in the various processing modes and, for example, subjects read images read by the first scanner section 21A and the second scanner section 21B to the shading correction. The erasing apparatus 100 carries out the various processing modes using image data after the shading correction. If it is a new reading command after the end of the various processing modes, the erasing apparatus 100 performs the shading correction for the first scanner section 21A and the second scanner section 21B using the shading plate 71 of the shading section 70. Timing for performing the shading correction is not limited. The erasing apparatus 100 may perform the shading correction for the first scanner section 21A and the second scanner section 21B every time the erasing apparatus 100 generates a reading command or may perform the shading correction when the erasing apparatus 100 generates a reading command after the end of image reading for a specified number of sheets.

The first scanner section 21A and the second scanner section 21B are not limited to the image reading sections of the erasing apparatus 100. Image reading sections of scanners that simply read an image without performing erasing processing may be used.

According to the first embodiment, if the shading correction for the first scanner section 21A and the second scanner section 21B is performed, the shading device 70 rotates the drum 72 to sequentially let out the shading plate 71 to the first scanner section 21A and the second scanner section 21B. If the first scanner section 21A or the second scanner section 21B reads the first surface 71d or the second surface 71f of the shading plate 71, the shading device 70 winds the shading plate 71 with the drum 72 and retracts the shading plate 71 to the outside of the first conveying path 61a. The first scanner section 21A and the second scanner section 21B respectively obtain shading correction data using both the surfaces of one shading plate 71 of the shading device 70.

According to the first embodiment, in the erasing apparatus 100, shading devices do not have to be provided respectively in the first scanner section 21A and the second scanner section 21B in order to obtain shading correction data of the first scanner section 21A and the second scanner section 21B. The erasing apparatus 100C reduces costs for obtaining shading correction data. It is unnecessary to arrange the shading device 70 in each of the first scanner section 21A and the second scanner section 21B, a space for the first scanner section 21A and the second scanner section 21B can be reduced. The first scanner section 21A and the second scanner section 21B can be arranged in close contact with each other. A difference between reading times of both the scanner sections can be reduced and reading speed can be reduced. if the first scanner section 21A and the second scanner section 213 scan the sheet P, the shading plate 71 is retracted to the outside of the first conveying path 61a and does not prevent the conveyance of the sheet P that passes the first scanner section 21A and the second scanner section 21B.

Further, the cleaners 76a and 76b as the cleaning members are respectively provided in positions of the upper guide 78a and the lower guide 78b adjacent to the first conveying path 61a. The cleaners 76a and 76b are made of, for example, felt and are respectively set in contact with the first surface 71d and the second surface 71f of the shading plate 71.

While the first scanner section 21A and the second scanner section 21B read the shading plate 71, the shading plate 71 comes into contact with respective glass surfaces 22a and 22b of the first scanner section 21A and the second scanner section 21B. If the shading plate 71 comes into contact with the glass surfaces 22a and 22b, stains on the glass surfaces 22a and 22b adhere to and soil the shading plate 71. While the shading plate 71 is let out in the arrow v direction and is further wound in the arrow w direction, the cleaners 76a and 76b respectively come into sliding contact with the first surface 71d and the second surface 71f of the shading plate 71. The cleaners 76a and 76b come into sliding contact with the shading plate 71 and clean the stains adhering to both the surfaces of the shading plate 71. The shading plate 71 keeps a desired whiteness degree by being cleaned by the cleaners 76a and 76b.

If the respective glass surfaces 22a and 22b of the first scanner section 21A and the second scanner section 21B are soiled while the sheet P is read, the erasing apparatus 100 cleans the glass surfaces 22a and 22b using the shading plate 71. For example, if a specified number of sheets P pass the first conveying path 61a, the erasing apparatus 100 drives the drum 72 to reciprocatingly move the shading plate 71 to clean the glass surfaces 22a and 22b. The erasing apparatus 100 cleans the glass surface 22a of the first scanner section 21A using the first surface 71d of the shading plate 71 and cleans the glass surface 22b of the second scanner section 21B using the second surface 71f of the shading plate 71.

The cleaners 76a and 76b come into sliding contact with the shading plate 71 soiled by cleaning the glass surfaces 22a and 22b and clean the stains adhering to both the surfaces of the shading plate 71.

Further, according to the first embodiment, the stains are cleaned from the respective glass surfaces 22a and 22b of the first scanner section 21A and of the second scanner section 21B using both the surfaces of the shading plate 71. The first scanner section 21A and the second scanner section 21B prevent a reading error due to the stains on the glass surfaces 22a and 22b and obtain a satisfactory read image. According to the first embodiment, while the drum 72 lets out or winds the shading plate 71, the cleaners 76a and 76b clean the stains adhering to both the surfaces of the shading plate 71. The shading plate 71 can keep the desired whiteness degree without stains.

Second Embodiment

A second embodiment is explained. In the second embodiment, a cleaning member that cleans an image reading section is provided in a shading member. In the second embodiment, components same as the components explained in the first embodiment are denoted by the same reference numerals and signs and detailed explanation of the components is omitted.

Figure 8:
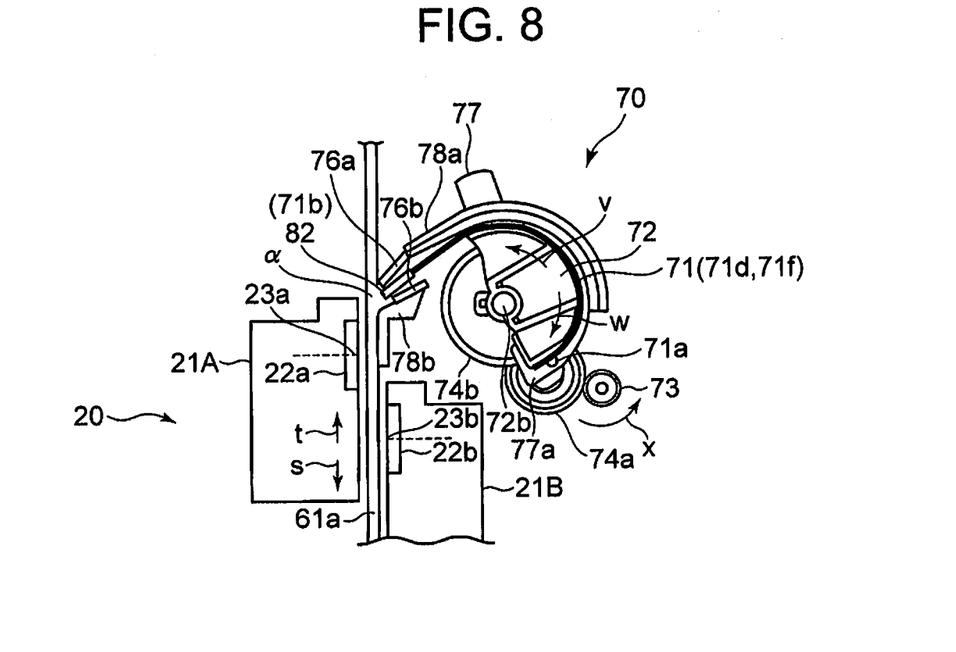
FIG. 8 is a schematic explanatory diagram of a state in which the other side of a shading plate according to a second embodiment reaches a retracted position.
Figure 9:
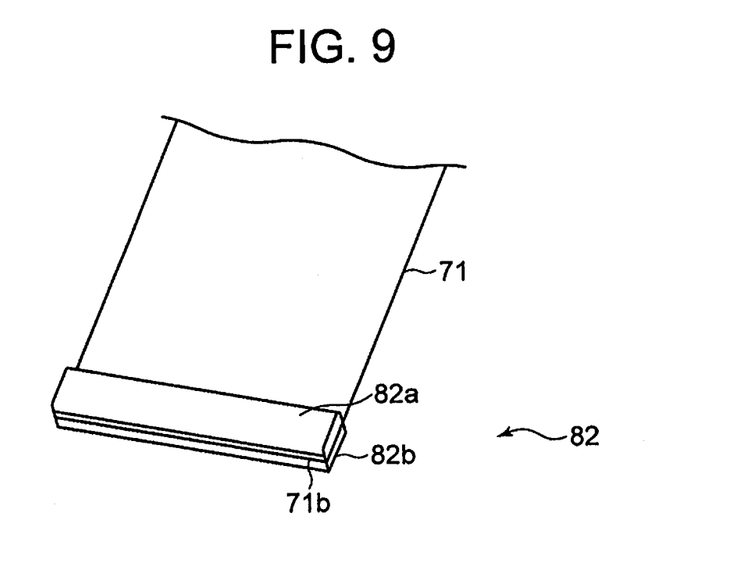
FIG. 9 is a schematic explanatory diagram of a scanner cleaner according to the second embodiment.

As shown in FIGS. 8 and 9, the shading plate 71 includes, on the other side 71b, a scanner cleaner 82 as the cleaning member. The scanner cleaner 82 is made of, for example, felt. While the shading plate 71 passes the first conveying path 61a, a first surface 82a of the scanner cleaner 82 comes into contact with the glass surface 22a of the first scanner section 21A to clean the glass surface 22a. While the shading plate 71 passes the first conveying path 61a, a second surface 82b of the scanner cleaner 82 comes into contact with the glass surface 22b of the second scanner section 21B to clean stains from the glass surface 22b.

While the shading plate 71 is moved to the reading positions 23a and 23b of the first scanner section 21A and the second scanner section 21B in order to acquire shading correction data, both the surfaces 82a and 82b of the scanner cleaner 82 attached to the other side 71b of the shading plate 71 respectively come into sliding contact with the glass surfaces 22a and 22b. The scanner cleaner 82 cleans the glass surfaces 22a and 22b of the first scanner section 21A and the second scanner section 21B using both the surfaces 82a and 82b.

If the first scanner section 21A and the second scanner section 21B end the reading of the shading plate 71, the shading plate 71 is wound by the drum 72 and reaches the retracted position α. While the shading plate 71 is wound by the drum 72, both the surfaces 82a and 82b of the scanner cleaner 82 respectively come into sliding contact with the glass surfaces 22a and 22b. The scanner cleaner 82 cleans the glass surfaces 22a and 22b of the first scanner section 21A and the second scanner section 21B again using both the surfaces 82a and 82b. While the shading plate 71 is present in the retracted position α, the scanner cleaner 82 is surely retracted from the first conveying path 61a and does not prevent the conveyance of the sheet P.

If the respective glass surfaces 22a and 22b of the first scanner section 21A and the second scanner section 21B are soiled while the sheet P is read, the erasing apparatus 100 cleans the glass surfaces 22a and 22b using the scanner cleaner 82. For example, if the sheets P that pass the first conveying path 61a exceed the specified number of sheets, the erasing apparatus 100 reciprocatingly moves the scanner cleaner 82 to clean the glass surfaces 22a and 22b.

According to the second embodiment, as in the first embodiment, the shading devices 70 do not have to be provided respectively in the first scanner section 21A and the second scanner section 21B in order to obtain shading correction data of the first scanner section 21A and the second scanner section 21B. Therefore, the space for the first scanner section 21A and the second scanner section 21B can be reduced. The shading plate 71 does not prevent the conveyance of the sheet P that passes the first scanner section 21A and the second scanner section 21B.

According to the second embodiment, the stains are cleaned from the respective glass surfaces 22a and 22b of the first scanner section 21A and the second scanner section 21B using both the surfaces 82a and 82b of the scanner cleaner 82. The first scanner section 21A and the second scanner section 21B prevent a reading error due to the stains on the glass surface 22a and 22b and obtain a satisfactory read image.

According to at least one of the embodiments explained above, the plural image reading sections respectively obtain shading correction data using one shading device. According to at least one of the embodiments explained above, an arrangement space for the shading device can be saved compared with an arrangement space required for respectively arranging shading devices with respect to the plural image reading sections. According to at least one of the embodiments explained above, the shading member is retracted to the outside of the conveying path for the recording medium and does not prevent the conveyance of the recording medium while the image reading sections read an image of a recording medium.

While certain embodiments have been described these embodiments have been presented by way of example only, and are not intended to limit the scope of the inventions. Indeed, the novel apparatus and methods described herein may be embodied in a variety of other forms: furthermore, various omissions, substitutions and changes in the form of the apparatus and methods described herein may be made without departing from the spirit of the inventions. The accompanying claims and their equivalents are intended to cover such forms of modifications as would fall within the scope and spirit of the invention.

The color erasing apparatus explained in the embodiments is not limited to an apparatus that erases a color of an image using heat. For example, the erasing apparatus may be either an apparatus that erases a color of an image on a sheet by irradiating light on the image or an apparatus that erases an image formed on a special sheet. Alternatively, the erasing apparatus may be an apparatus that removes an image on a sheet. The erasing apparatus only has to have a configuration for making an image invisible in order to make a sheet reusable.

What is claimed is:

1. A shading device comprising:
a flexible shading member configured to be moved into a conveying path for conveying a recoding medium to a first extended position facing a first image reading section and to a second extended position facing a second image reading section arranged on an opposite side of the conveying path relative to the first image reading section, the second extended position being different from the first extended position, wherein the flexible shading member provides shading correction for the first image reading section using a first surface and provides shading correction for the second image reading section using a second surface opposite to the first surface;
a moving member configured to rotate the flexible shading member around a radius so that the flexible shading member is moved between the first extended position, the second extended position, and a retracted position outside of the conveying path; and
a control member configured to control the moving member so that the flexible shading member is stopped at the first and second extended positions at different times.

2. The device according to claim 1, wherein:
a first end of the flexible shading member is directly attached to the moving member and a second end of the flexible shading member is not directly attached to the moving member, and
the control member is configured to control the moving member so that the second end is stopped at the first extended position and then the second end is moved to and stopped at the second extended position.

3. The device according to claim 2, wherein:
the moving member includes a winding member that is directly attached to the first end of the flexible shading member, the winding member winding the flexible shading member to move the flexible shading member to the retracted position and unwinding the flexible shading member to move the flexible shading member to the first and second extended positions, and
the control member is configured to control the moving member so that the flexible shading member is moved to the retracted position after the flexible shading member is stopped at the first extended position and at the second extended position.

4. The device according to claim 3, wherein the moving member includes:
a stepping motor to drive the winding member; and
a sensor to detect that the winding member winds the flexible shading member.

5. The device according to claim 1, further comprising a cleaning member configured to come into contact with the flexible shading member while the flexible shading member is rotated.

6. The device according to claim 1, wherein the flexible shading member includes a supporting member and a white member provided on the supporting member.

7. The device according to claim 1, wherein the flexible shading member further includes a cleaning member configured to come into contact with the plural image reading sections.

8. An image reading apparatus comprising:
a conveying path for conveying a recording medium;
a first image reading section configured to read a first side of the recording medium that is conveyed on the conveying path;
a second image reading section arranged on an opposite side of the conveying path relative to the first image reading section and configured to read a second side of the recording medium that is conveyed on the conveying path;
a flexible shading member configured to be moved into the conveying path to a first extended position facing the first image reading section and to a second extended position facing the second image reading section, the second extended position being different from the first extended position, wherein the flexible shading member provides shading correction for the first image reading section using a first surface and provides shading correction for the second image reading section using a second surface opposite to the first surface;

a moving member configured to rotate the flexible shading member between the first extended position, the second extended position, and a retracted position outside of the conveying path; and a control member configured to control the moving member so that the flexible shading member is stopped at the first and second extended positions at different times.

9. The apparatus according to claim 8, wherein:

the moving member is directly attached to a first end of the flexible shading member and not directly connected to a second end of the flexible shading member, the moving member winding the flexible shading member to move the flexible shading member between the first extended position, the second extended position, and the retracted position, and the control member is configured to control the moving member so that the second end is stopped at the first extended position and then the second end is moved to and stopped at the second extended position.

10. The apparatus according to claim 9, wherein:

the moving member includes a winding member that is directly attached to the first end of the flexible shading member, the winding member winding the flexible shading member to move the flexible shading member to the retracted position and unwinding the flexible shading member to move the flexible shading member to the first and second extended positions, and the control member is configured to control the moving member so that the flexible shading member is moved to the retracted position after the flexible shading member is stopped at the first extended position and at the second extended position.

11. The apparatus according to claim 10, wherein the moving member includes:

a stepping motor to drive the winding member; and a sensor to detect that the winding member winds the flexible shading member.

12. The apparatus according to claim 8, further comprising a cleaning member configured to come into contact with the flexible shading member while the flexible shading member is rotated.

13. The apparatus according to claim 8, wherein the flexible shading member further includes a cleaning member configured to come into contact with the first image reading section and the second image reading section.

14. A shading correction method comprising:

rotating a flexible shading member around a radius so that the flexible shading member is moved from a retracted position outside of a conveying path for conveying a recording medium to a first extended position facing a first image reading section and to a second extended position facing a second image reading section arranged on an opposite side of the conveying path relative to the first image reading section, the second extended position being different from the first extended position;

stopping the flexible shading member at the first and second extended positions at different times;

reading a first surface of the flexible shading member with the first image reading section and reading a second surface opposite to the first surface of the flexible shading member with the second image reading section;

rotating the flexible shading member around the radius so that the flexible shading member is moved to the retracted position; and performing shading correction for each of the first image reading section and the second image reading section using a result of the reading of the first and second surfaces of the flexible shading member.

15. The method according to claim 14, wherein rotating the flexible shading member so that the flexible shading member is moved from the retracted position to the extended position includes unwinding the flexible shading member, and rotating the flexible shading member so that the flexible shading member is moved from the extended position to the retracted position includes winding the flexible shading member.

16. The method according to claim 14, further comprising cleaning the flexible shading member while rotating the flexible shading member.

17. The method according to claim 14, further comprising cleaning the plural image reading sections using both surfaces of the flexible shading member.

* * * * *